United States Patent
Goedel et al.

(10) Patent No.: US 7,845,222 B1
(45) Date of Patent: Dec. 7, 2010

(54) METHOD AND ASSEMBLY FOR SENSING PROCESS PARAMETERS

(75) Inventors: Jarodd Dan Goedel, Sherburne, NY (US); Gregory Lloyd Ashton, South Plymouth, NY (US); John Patrick Parsons, Binghamton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 12/697,377

(22) Filed: Feb. 1, 2010

(51) Int. Cl.
*A63B 53/00* (2006.01)
(52) U.S. Cl. .................................. 73/170.02
(58) Field of Classification Search .............. 73/170.02; 277/134 R
See application file for complete search history.

(56) References Cited

U.S. PATENT DOCUMENTS

| | | | |
|---|---|---|---|
| 3,925,979 A | 12/1975 | Ziegler | |
| 4,783,026 A * | 11/1988 | Rumford et al. | 244/134 R |
| 4,972,672 A | 11/1990 | Sanderson et al. | |
| 5,011,098 A * | 4/1991 | McLaren et al. | 244/134 B |
| 5,484,122 A | 1/1996 | DeSalve | |
| 2008/0053100 A1 | 3/2008 | Venkataramani et al. | |
| 2009/0308076 A1 | 12/2009 | Nims | |

\* cited by examiner

*Primary Examiner*—Jewel Thompson
(74) *Attorney, Agent, or Firm*—William Scott Andes, Esq.; Armstrong Teasdale LLP (57) ABSTRACT

A method and an assembly for sensing a process parameter are provided. The sensor assembly includes a base, a pedestal including a body extending between a leading edge and a trailing edge in a direction of fluid flow past the body, a first edge of the pedestal coupled to the base, a second edge opposes the first edge. The sensor assembly also includes an airfoil extending from the pedestal, a leading edge of the airfoil aligned with the leading edge of the pedestal, the airfoil extending in a direction of a flow of fluid along the second edge. The sensor assembly further includes a sensor element extending from the second edge spaced apart from the airfoil by a first gap, and a shield at least partially surrounding the sensor element, the shield spaced apart from the airfoil by a second gap defining a fluid flow inlet to the sensor element.

20 Claims, 6 Drawing Sheets

METHOD AND ASSEMBLY FOR SENSING PROCESS PARAMETERS

BACKGROUND OF THE INVENTION

The field of the invention relates generally to process parameter sensing devices and more specifically, to an assembly and method of sensing a process parameter.

At least some known sensors are susceptible to ice buildup due to their position and orientation in their environment. Some of these sensors use a heating system, for example, an electrical or pneumatic heating system, to prevent ice build up. Generally, the ice build up is due to the combination of water content in the fluid surrounding the sensor, the ambient temperature, and shape of the sensor.

The heating system adds complexity, weight, and cost to the sensor, may affect sensor performance, and introduce errors into the sensor output. The errors may relate to a time response of the sensor, a recovery error, and because current sensors are designed for optimal performance at zero angle of attack airflow conditions, an error due an angle of attack of the sensor with respect to the flow past the sensor.

BRIEF DESCRIPTION OF THE INVENTION

In one embodiment, a sensor assembly includes a base, a pedestal including a body extending between a leading edge and a trailing edge in a direction of fluid flow past the body, a first edge of the pedestal coupled to the base, a second edge opposes the first edge. The sensor assembly also includes an airfoil extending from the pedestal, a leading edge of the airfoil aligned with the leading edge of the pedestal, the airfoil extending in a direction of a flow of fluid along the second edge. The sensor assembly further includes a sensor element extending from the second edge spaced apart from the airfoil by a first gap, and a shield at least partially surrounding the sensor element, the shield spaced apart from the airfoil by a second gap defining a fluid flow inlet to the sensor element.

In another embodiment, a method of sensing a process parameter includes positioning a process sensor assembly within a flow of fluid, the sensor assembly including a convex surface and an adjacent concave surface oriented serially in a direction of the flow of fluid, sampling a portion of the flow of fluid after the portion of the flow of fluid is decelerated by the concave surface, and channeling the portion of the flow of fluid to a sensor element shielded from direct impingement of the flow of fluid.

In yet another embodiment, a process sensing system includes a fluid conveyor including a sidewall, a pedestal coupled to the sidewall, and an airfoil extending from the pedestal, the airfoil substantially symmetric about a longitudinal axis extending substantially in a direction of a flow of fluid through the fluid conveyor, the airfoil including a convex surface and a convex surface oriented serially in the direction of the flow of fluid. The process sensing system also includes a sensor element extending from the pedestal downstream of the airfoil, and a shield at least partially surrounding the sensor element, the shield spaced apart from the sensor element by a sensor flow channel, the shield spaced apart from the airfoil by a second gap defining a fluid flow inlet to the sensor element.

BRIEF DESCRIPTION OF THE DRAWINGS

FIGS. 1-6 show exemplary embodiments of the method and assembly described herein.

DETAILED DESCRIPTION OF THE INVENTION

The following detailed description illustrates embodiments of the invention by way of example and not by way of limitation. It is contemplated that the invention has general application to analytical and methodical embodiments of sensing process parameters in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
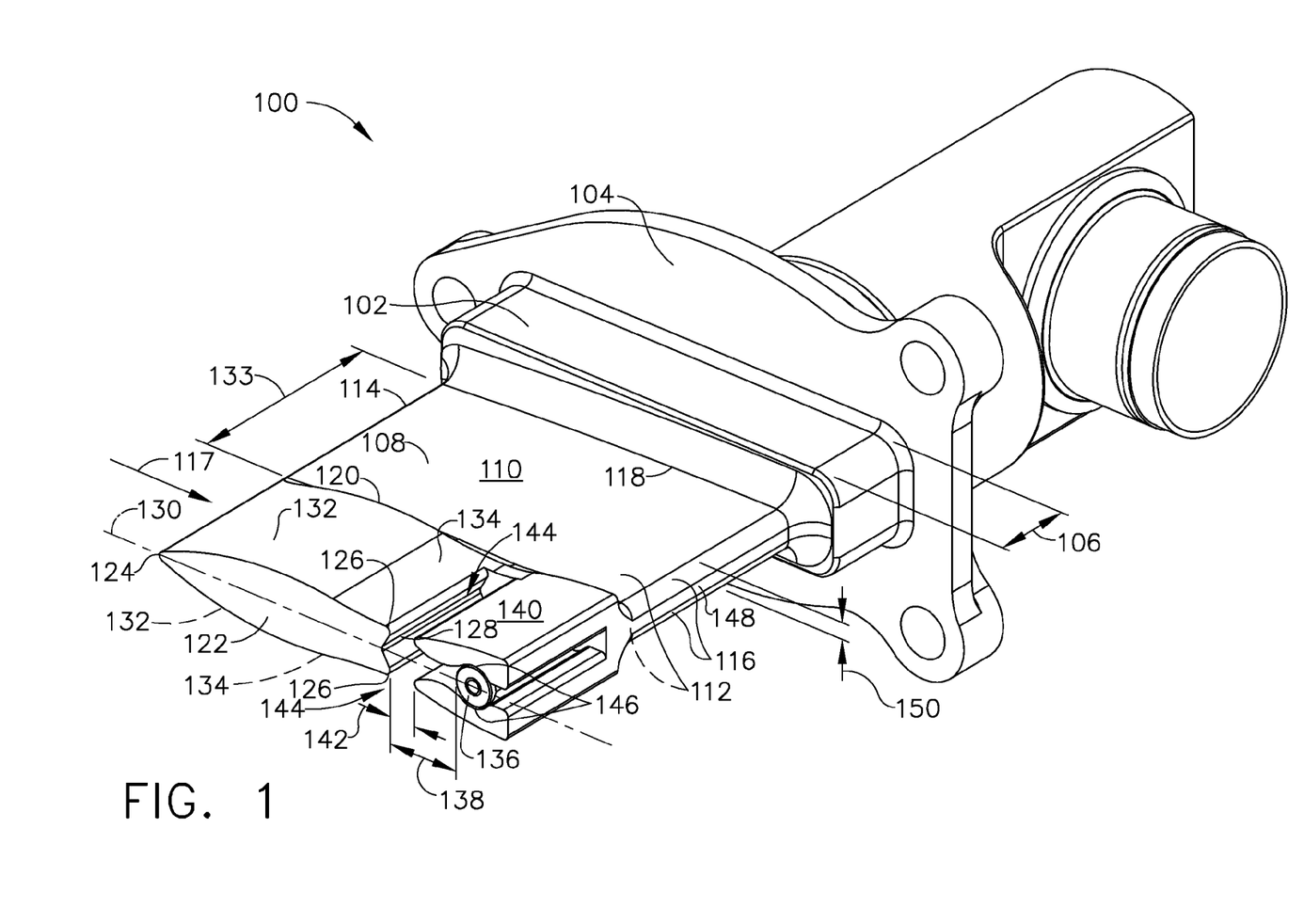
FIG. 1 is a perspective view of a process sensor assembly in accordance with an exemplary embodiment of the present invention.

FIG. 1 is a perspective view of a process sensor assembly 100 in accordance with an exemplary embodiment of the present invention. In the exemplary embodiment, process sensor assembly 100 includes a base 102 coupled to a flange 104. Base 102 extends a height 106 away from flange 104. Height 106 is selected to substantially match a thickness of a sidewall of a fluid conveying member such as, but not limited to, a pipe and a gas turbine engine casing.

Process sensor assembly 100 includes a pedestal 108 having a substantially triangular cross-section. Pedestal 108 includes a body 110 having substantially symmetric sidewalls 112 diverging between a knife-edge leading edge 114 and a respective trailing edge 116 in a direction 117 of a flow of fluid. A first edge 118 of pedestal 108 is coupled to base 102 and a second edge 120 opposes first edge 118.

Process sensor assembly 100 includes an airfoil 122 extending from pedestal 108. A leading edge 124 of airfoil 122 is substantially aligned with leading edge 114 of pedestal 108. Airfoil 122 extends along edge 120 in direction 117 to respective trailing edges 126 separated by a concave trailing surface 128. In various embodiments, airfoil 122 is symmetric about a centerline 130. Airfoil 122 includes a convex surface portion 132 upstream from a concave surface portion 134. Convex surface portion 132 extends from leading edge 124 to concave surface portion 134 and concave surface portion 134 extends from convex surface portion 132 to trailing edge 126. A profile of convex surface portion 132 and concave surface portion 134 is configured to channel liquid entrained in a fluid flowing over convex surface portion 132 and concave surface portion 134 away from fluid flow inlet 144 to sensor element 136. Pedestal 108 includes a height 133 between first edge 118 and second edge 120 wherein height 121 is selected to extend airfoil 122 into the flow of fluid beyond a boundary layer of the flow of fluid.

A sensor element 136 extends from second edge 120 and is spaced apart from airfoil 122 by a first gap 138. A shield 140 at least partially surrounds sensor element 136. Shield 140 is spaced apart from trailing edge 126 by a second gap 142 defining a fluid flow inlet 144 to sensor element 136. In the exemplary embodiment, shield 140 is formed of separate airfoils. In various embodiments, shield 140 is formed of a single member configured to perform the functions described herein. A gap is maintained between shield 140 and sensor element 136 that defines a sensor flow channel 146. Pedestal 110 includes knife edge leading edge 114 and a trailing surface 148 having a width 150. Airfoil 122 includes a varying width between leading edge 124 and trailing edges 126 that is generally greater than width 150.

Flange 104 is coupled to base 102. Flange 104 is configured to couple to a wall (not shown) of a fluid conveying member, such as, but not limited to a pipe and a gas turbine engine casing.

Figure 2:
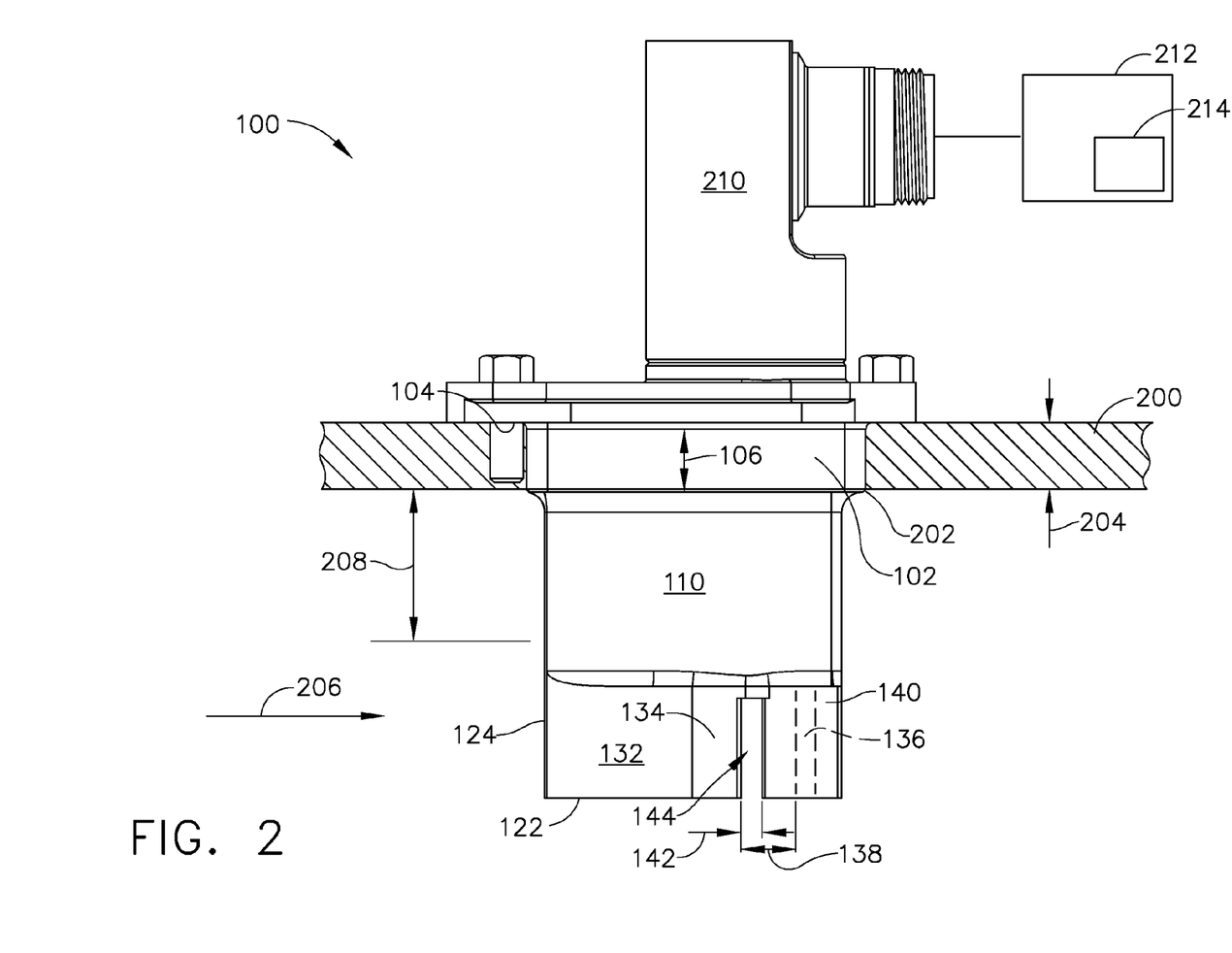
FIG. 2 is a side elevation view of process sensor assembly in accordance with an exemplary embodiment of the present invention.

FIG. 2 is a side elevation view of process sensor assembly 100 in accordance with an exemplary embodiment of the present invention. In the exemplary embodiment, process sensor assembly 100 is couplable to a gas turbine engine casing 200 through an aperture 202. Height 106 substantially matches a thickness 204 of casing 200. Pedestal 110 includes height 133 selected to extend airfoil 122 into a flow of fluid 206 beyond a boundary layer 208 of flow of fluid 206. An electrical connection box 210 facilitates connecting electrical conduits between sensor element 136 and, for example, but not limited to, a control system 212 comprising a processor 214.

During assembly, process sensor assembly 100 is inserted into aperture 202 through engine casing 200 or other fluid conveying member. Pedestal 110 is selected based on positioning airfoil 122 and sensor element 136 away from engine casing 200 a distance sufficient for airfoil 122 and sensor element 136 to be beyond a boundary layer of fluid flow through engine casing 200.

During operation, fluid flow past process sensor assembly 100 may contain entrained water, ice, and/or particulate matter. Water and ice impinging on pedestal 110 are shed quickly due to knife edge leading edge 114 and the narrow wedge shape of pedestal 110. Entrained ice and water passing airfoil 122 is accelerated by convex surface 132 and then decelerated by concave surface 134. The flow of fluid at the trailing edge of concave surface 134 is substantially stalled. However, because of the mass of the water and ice, they can not decelerate quickly and is carried on past shield 140 and consequently can not enter fluid flow inlet 144. The stalled fluid flow, because of its slow velocity is able to enter fluid flow inlet 114 aided by a low pressure volume generated proximate surface 128. The fluid is then directed through sensor flow channel 146, where sensor element 136 is able to interact with the fluid flow to determine one or more process parameters associated with the fluid flow. The fluid flow exits process sensor assembly 100 through exhaust port 300 (shown in FIG. 3).

Figure 3:
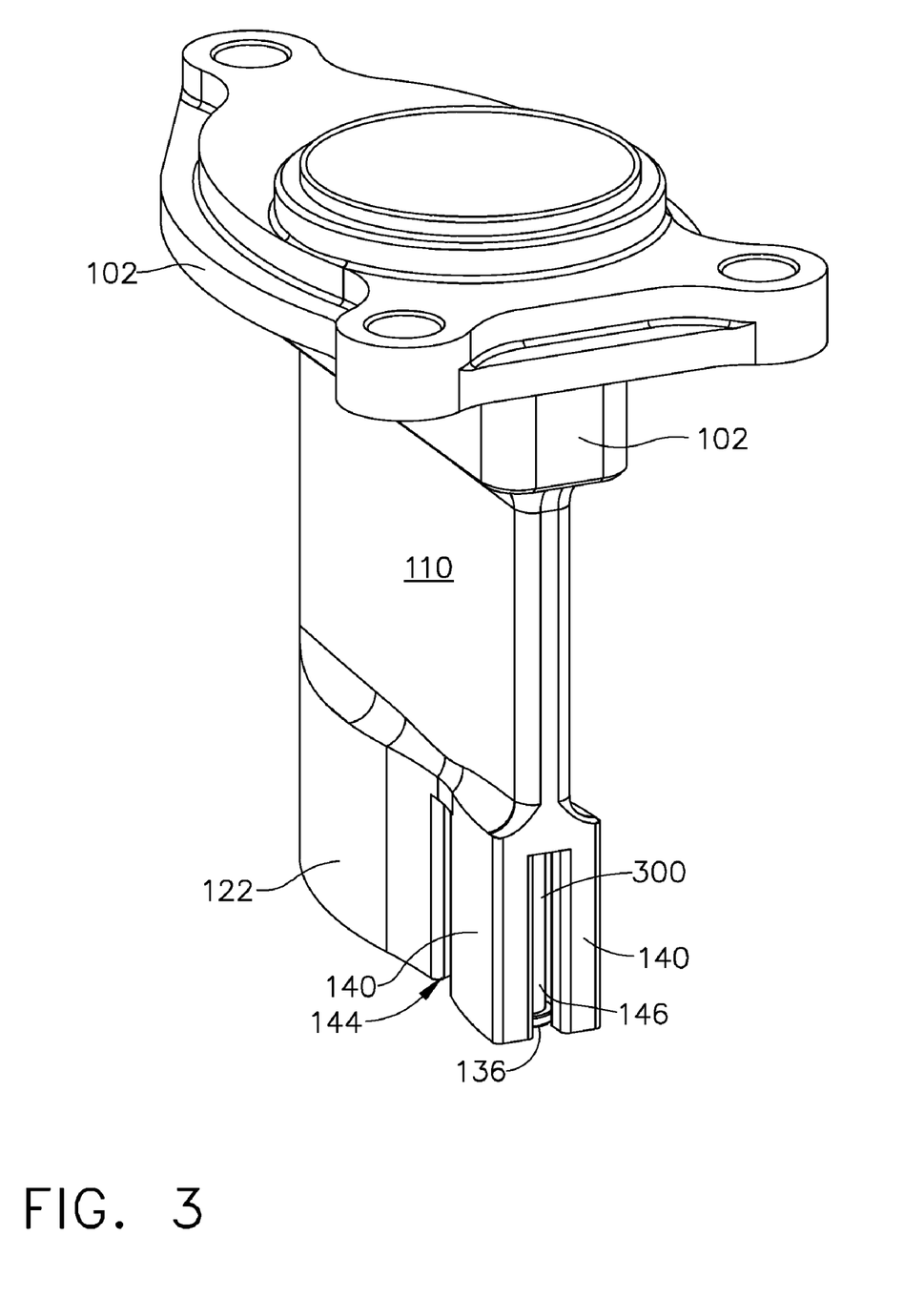
FIG. 3 is a perspective view of process sensor assembly looking upstream.

FIG. 3 is a perspective view of process sensor assembly 100 looking upstream. In the exemplary embodiment, an exhaust port 300 is coupled in flow communication to fluid flow inlet 144 and sensor flow channel 146.

Figure 4:
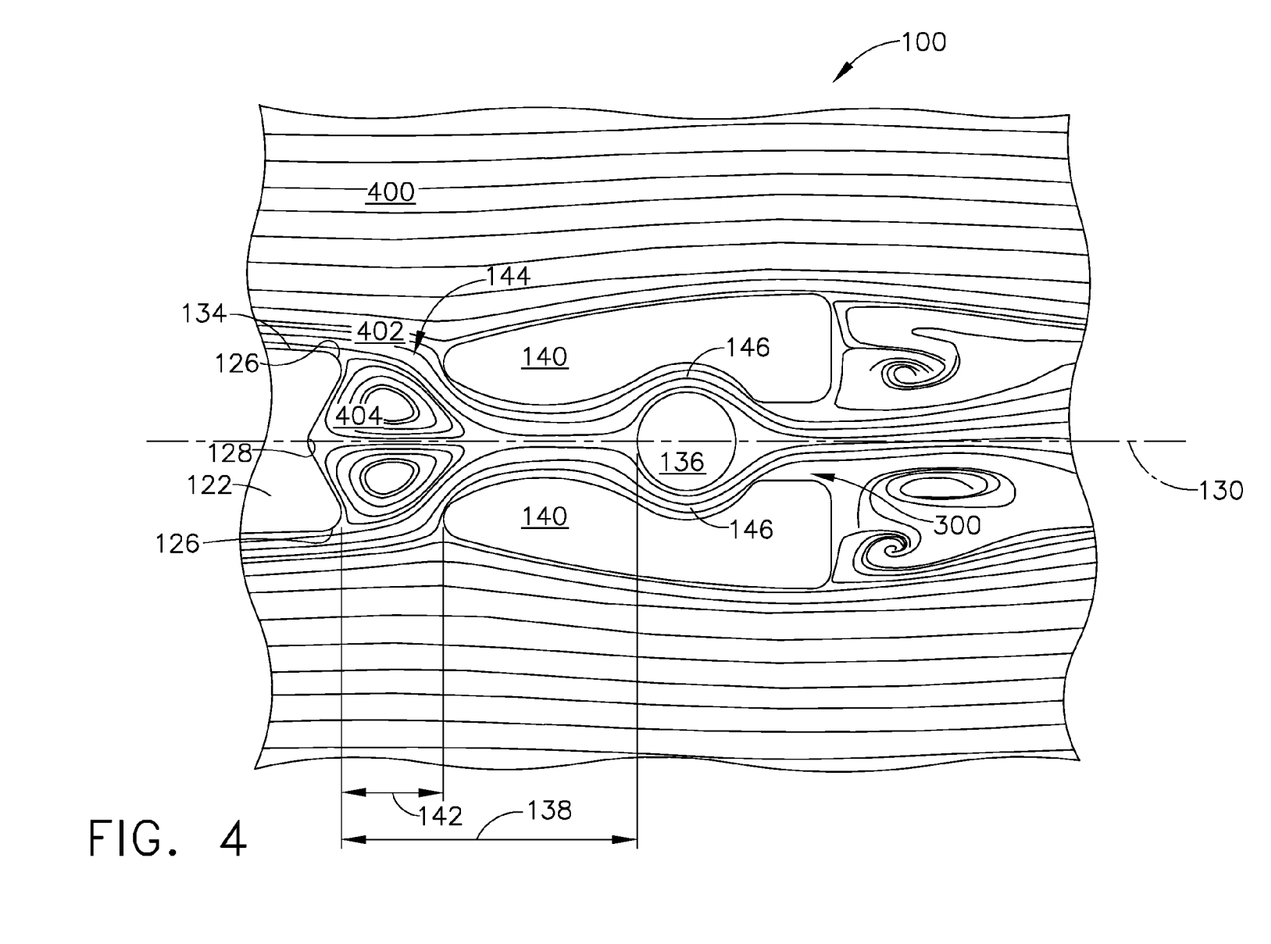
FIG. 4 is a diagram indicating lines of flow of fluid past process sensor assembly in accordance with an exemplary embodiment of the present invention.

FIG. 4 is a diagram indicating lines of flow of fluid past process sensor assembly 100 in accordance with an exemplary embodiment of the present invention. In the exemplary embodiment, a bulk flow of fluid 400 flows past process sensor assembly 100. Bulk flow of fluid 400 flows past airfoil 122 which accelerates a portion (not shown in FIG. 4) of bulk flow of fluid 400 along convex surface portion 132 (not shown in FIG. 4) and then decelerates bulk flow of fluid 400 along concave surface portion 134 such that a portion 402 of bulk flow of fluid 400 substantially stalls proximate fluid flow inlet 144. Because the momentum of water droplets and particulates that may be present in bulk flow 400 substantially prevent these particles from decelerating as quickly as portion 402, theses particles remain entrained in bulk flow 400 and do not enter fluid flow inlet 144. Therefore portion 402 is substantially free of any water droplets or particulate matter that can form into ice or Portion 402 is further facilitated being drawn into fluid flow inlet 144 by a low pressure area 404 formed at concave trailing surface 128. Portion 402 is channeled through sensor flow channel 146 where the parameter sensed by sensor element 136 is determined. In the exemplary embodiment, sensor element 136 is a temperature sensor. In various embodiments, sensor element 136 is other than a temperature sensor, for example, but not limited to, a pressure sensor, a differential pressure sensor, a flow sensor, a gas composition sensor, and a fluid chemistry sensor.

Figure 5:
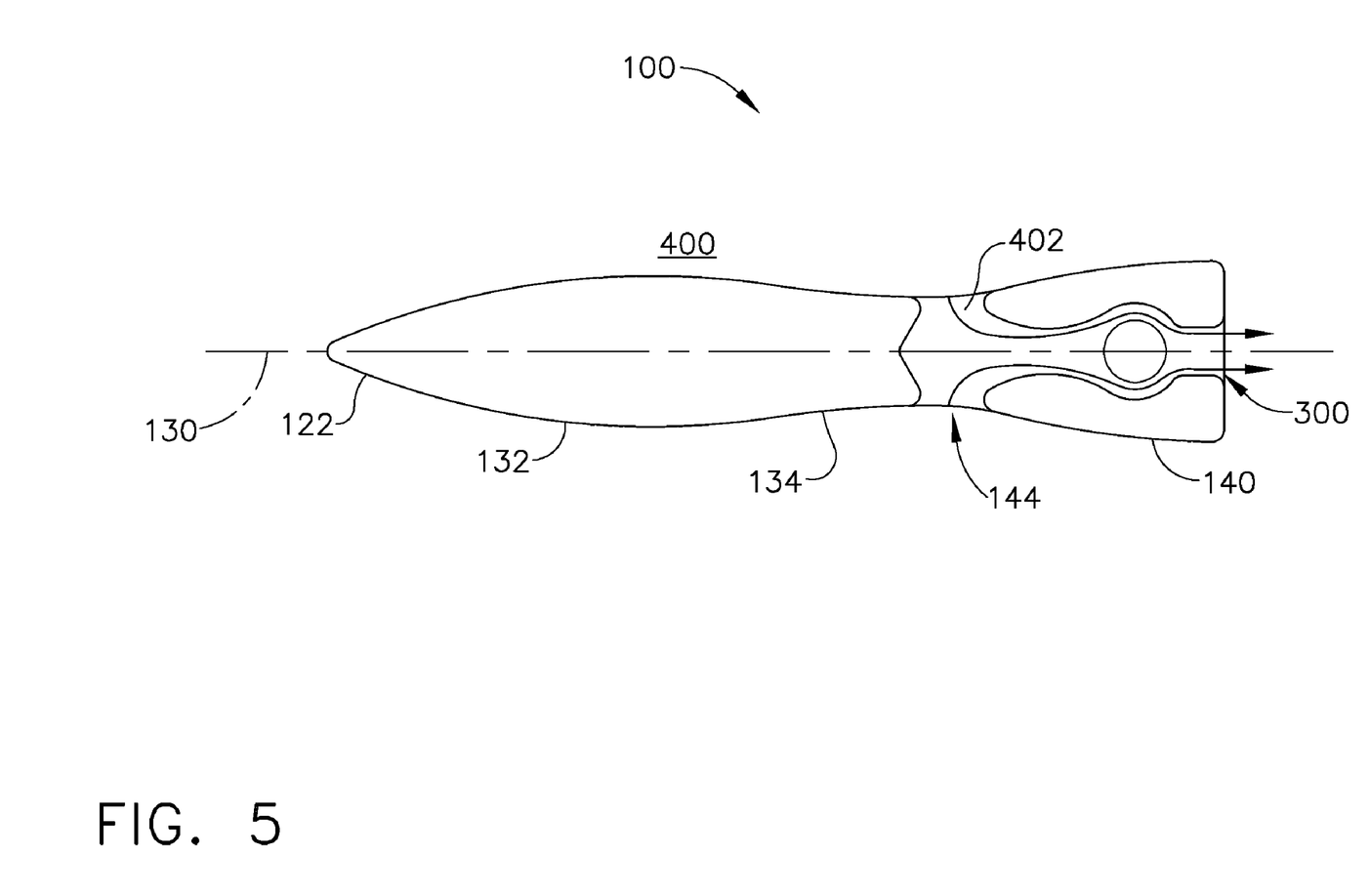
FIG. 5 is a diagram indicating lines of flow of fluid past process sensor assembly in accordance with an exemplary embodiment of the present invention.

FIG. 5 is a diagram indicating lines of flow of fluid past process sensor assembly 100 in accordance with an exemplary embodiment of the present invention. In the exemplary embodiment, bulk flow of fluid 400 flows past process sensor assembly 100 at a zero angle of attack. Surfaces 132 and 134 channel portion 402 through fluid flow inlet 144 and sensor flow channel 146 without exposing sensor element 136 to impingement or contact with water or particulates from bulk flow 400.

Figure 6:
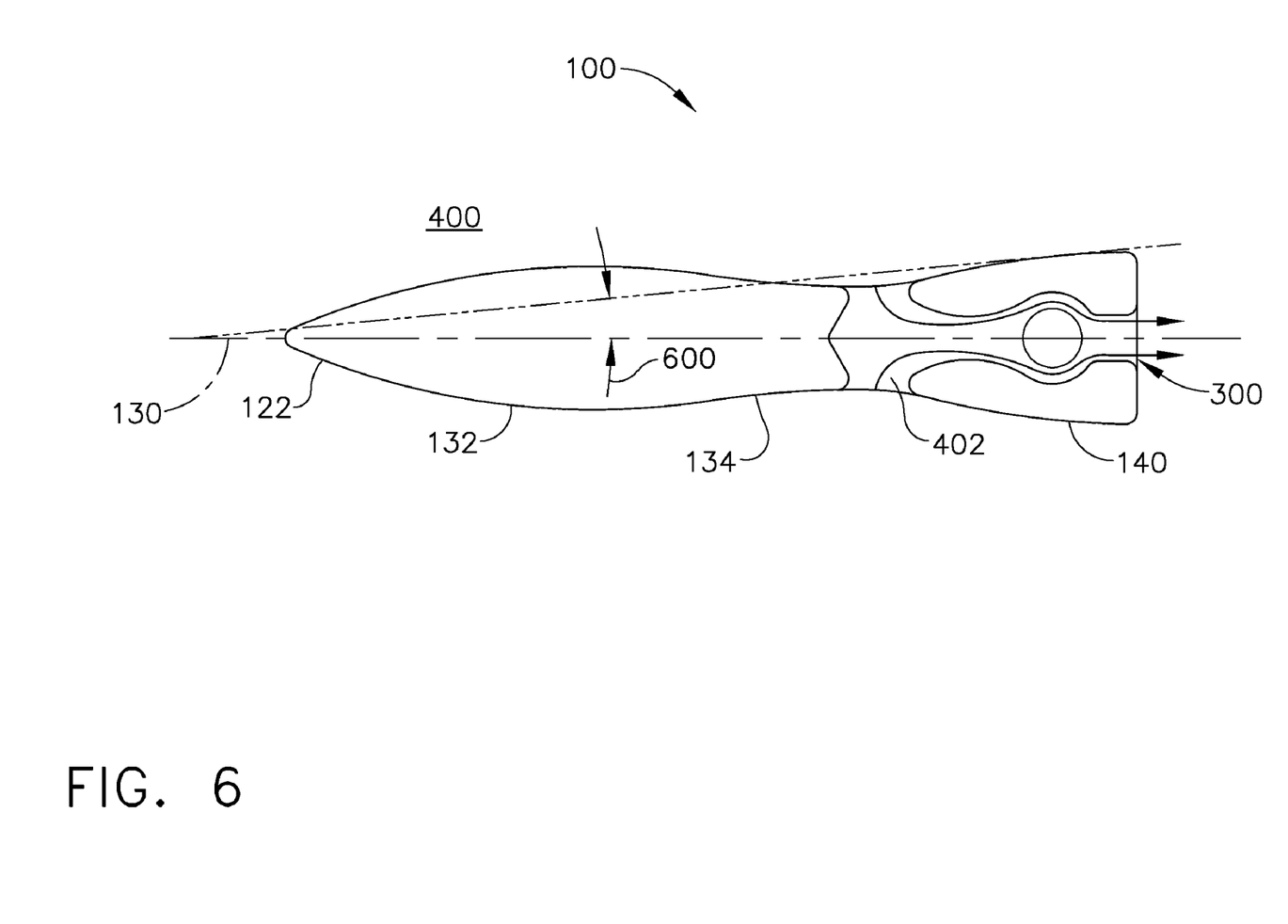
FIG. 6 is a diagram indicating lines of flow of fluid at an exemplary angle of attack past process sensor assembly in accordance with an exemplary embodiment of the present invention.

FIG. 6 is a diagram indicating lines of flow of fluid past process sensor assembly 100 in accordance with an exemplary embodiment of the present invention. In the exemplary embodiment, bulk flow of fluid 400 flows past process sensor assembly 100 at a positive angle of attack 600. Surfaces 132 and 134 channel portion 402 through fluid flow inlet 144 and sensor flow channel 146 without exposing sensor element to impingement or contact with water or particulates from bulk flow 400. In the exemplary embodiment, angle of attack 600 equals approximately 5°. In various other embodiments, angle of attack 600 equals an angle greater than approximately 5°.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 214, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for sensing a process parameters using an unheated sensor in a location where icing and water impingement may introduce errors in the value of the sensed parameter. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and assembly for sensing a process parameter provides a cost-effective and reliable means for reducing effects of direct water and/or ice impingement on the sensor, angle of attack, and time response. More specifically, the methods and assembly described herein facilitate separating water and/or ice from a flow of fluid. In addition, the above-described methods and assembly facilitate sampling a low velocity portion of the flow of fluid without moving parts in the process sensor assembly. As a result, the methods and assembly described herein facilitate measuring parameters of a process in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A sensor assembly comprising:
 a base;
 a pedestal comprising a body extending between a leading edge and a trailing edge in a direction of fluid flow past said body, a first edge of said pedestal coupled to said base, a second edge opposes said first edge;
 an airfoil extending from said pedestal, a leading edge of said airfoil aligned with said leading edge of said pedestal, said airfoil extending in a direction of a flow of fluid along said second edge;
 a sensor element extending from said second edge spaced apart from said airfoil by a first gap; and
 a shield at least partially surrounding said sensor element, said shield spaced apart from said airfoil by a second gap defining a fluid flow inlet to said sensor element.

2. A sensor assembly in accordance with claim 1, further comprising a gap between said shield and said sensor defining a sensor flow channel.

3. A sensor assembly in accordance with claim 1, wherein said airfoil comprises a first sidewall extending between said leading edge and a first trailing edge, a profile of said first sidewall is configured to channel liquid entrained in a fluid flowing over said first sidewall away from said fluid flow inlet to said sensor element.

4. A sensor assembly in accordance with claim 1, wherein said airfoil comprises a first concave sidewall portion extending between said leading edge and a first convex sidewall portion, said first convex sidewall portion extending from said first concave sidewall portion and a first trailing edge of said airfoil.

5. A sensor assembly in accordance with claim 1, wherein said airfoil is symmetric about a centerline of said airfoil in a direction of fluid flow.

6. A sensor assembly in accordance with claim 3, wherein said airfoil comprises a second sidewall extending between said leading edge and a second trailing edge and opposing said first sidewall, a profile of said second sidewall is configured to channel liquid entrained in a fluid flowing over said second sidewall away from said fluid flow inlet to said sensor element.

7. A sensor assembly in accordance with claim 1, wherein said airfoil comprises a convex surface extending between a first trailing edge and a second trailing edge of said airfoil.

8. A sensor assembly in accordance with claim 1, wherein said pedestal and said airfoil each comprises a width orthogonal to the direction of flow, the width of said pedestal is less than the width of the airfoil.

9. A sensor assembly in accordance with claim 1, further comprising a flange coupled to said base, said flange configured to couple to a wall of a fluid conveying member.

10. A sensor assembly in accordance with claim 1, wherein said pedestal comprises a knife-edge leading edge and diverging sidewalls extending from said leading edge to respective trailing edges of said pedestal.

11. A sensor assembly in accordance with claim 1, wherein said body of said pedestal comprises a height between said first edge and said second edge, said height selected to extend said airfoil into the flow of fluid beyond a boundary layer of the flow of fluid.

12. A method of sensing a process parameter, said method comprising:
 positioning a process sensor assembly within a flow of fluid, the sensor assembly comprising a convex surface and an adjacent concave surface oriented serially in a direction of the flow of fluid;
 sampling a portion of the flow of fluid after the portion of the flow of fluid is decelerated by the concave surface; and
 channeling the portion of the flow of fluid to a sensor element shielded from direct impingement of the flow of fluid.

13. A method in accordance with claim 12 wherein positioning a process sensor assembly within a flow of fluid comprises positioning the sensor element using a pedestal that extends beyond a boundary flow layer adjacent a sidewall of a conduit conveying the flow of fluid.

14. A method in accordance with claim 12 wherein positioning a process sensor assembly within a flow of fluid comprises positioning the sensor element using a pedestal that includes a knife-edge leading edge in the direction of the flow of fluid.

15. A method in accordance with claim 12 wherein positioning a process sensor assembly within a flow of fluid comprises positioning the sensor element using a pedestal that includes a pair of sidewalls diverging from a knife-edge leading edge to a respective pair of trailing edges separated by a concave trailing surface.

16. A method in accordance with claim 12 wherein sampling a portion of the flow of fluid comprises creating a relatively low pressure volume proximate a concave trailing surface within an inlet of a flow channel.

17. A method in accordance with claim 12 wherein sampling a portion of the flow of fluid comprises substantially stalling the portion of the flow of fluid proximate to an inlet of a flow channel using the concave surface.

18. A process sensing system comprising:
 a fluid conveyor comprising a sidewall;

a pedestal coupled to said sidewall;

an airfoil extending from said pedestal, said airfoil substantially symmetric about a longitudinal axis extending substantially in a direction of a flow of fluid through the fluid conveyor, said airfoil comprising a convex surface and a convex surface oriented serially in the direction of the flow of fluid;

a sensor element extending from said pedestal downstream of said airfoil; and a shield at least partially surrounding said sensor element, said shield spaced apart from said sensor element by a sensor flow channel, said shield spaced apart from said airfoil by a second gap defining a fluid flow inlet to said sensor element.

19. A system in accordance with claim 18 further comprising wherein said pedestal comprises a wedge shaped cross-section having a knife edge leading edge and a pair of trailing edges spaced apart by a trailing surface.

20. A system in accordance with claim 18 wherein said airfoil is configured to substantially stall a flow of fluid using said concave surface proximate the fluid flow inlet.

* * * * *